United States Patent Office 2,702,232
Patented Feb. 15, 1955

2,702,232

METAL TUNGSTITES

Herrick R. Arnold, Wilmington, and James E. Carnahan, New Castle, Del., assignors to E. I. du Pont de Nemours & Company, Wilmington, Del., a corporation of Delaware No Drawing. Application January 30, 1951,
Serial No. 208,662

5 Claims. (Cl. 23—51)

This invention relates to new compositions of matter and to methods for their preparation. More particularly this invention relates to new chemical compounds containing tungsten and to methods for preparing them.

It is an object of this invention to provide new compositions of matter. A further object is to provide new chemical compounds containing tungsten and methods for their preparation. A still further object is to provide new catalytic compounds. Other objects will appear hereinafter.

The objects of this invention are accomplished by the following new chemical compounds which are metal tungstites corresponding in composition to metal salts of an acid having one of the formulae $H_2WO_2$ and $H_2WO_3$.

In actual practice these tungstites are obtained by reacting, in the presence of excess ammonia, stoichiometric proportions of normal ammonium tungstate with a salt of the metal whose tungstite is desired, washing the precipitate which forms, filtering it, drying it, and then calcining it for from 4 to 24 hours at 350 to 500° C. The calcined material, in granular or powdered form, is then reduced in a hydrogen containing atmosphere at temperatures ranging from room temperature up to 700° C., the heating being gradual and extending over a period varying from 2 to 100 hours depending upon the temperature schedule used.

The invention is illustrated by preferred embodiments in the following examples.

Example I

Four moles of ammonium tungstate [(NH$_4$)$_2$WO$_4$] in a 10% aqueous solution, prepared by dissolving 1080 g. of ammonium paratungstate [(NH$_4$)$_6$W$_7$O$_{24}$.6H$_2$O] in 7000 cc. of water and 310 cc. of 28% aqueous ammonia at 85° C., was added with stirring to 4 moles of nickel nitrate in a 16% solution, prepared by dissolving 1163 g. of Ni(NO$_3$)$_2$6H$_2$O in 6000 cc. of water at 85° C. A pale green precipitate was formed in a slurry having a pH of approximately 6. The pH of the slurry was adjusted to 7 at 75° C. by addition of 404 cc. of 28% aqueous ammonia. The resulting precipitate was washed, filtered, dried, and calcined at 400° C. The product thus obtained was charged into a furnace and heat treated at 400° C. in a stream of nitrogen at a space velocity of 390 volumes of gas per volume of catalyst per hour for 12 hours, cooled to room temperature in nitrogen, and the product then reduced for 24–47 hours at 450–480° C. in hydrogen at a space velocity of 600–1000 volumes of gas per volume of catalyst per hour. The reduced product corresponded by analysis to nickel tungstite (NiWO$_2$) containing a slight excess of W$_2$O$_3$. Magnetic measurements showed that essentially all the nickel was present in a chemically combined state. The product was not spontaneously pyrophoric when exposed to air at room temperature. On warming slightly over a Bunsen flame, however, the product ignited with a bright glow and oxidized to yellow nickel tungstate. X-ray diffraction analysis of the nickel tungstite indicated that metallic nickel and WO$_2$ were present in trace amounts while the major part of the mass was amorphous in character.

The yellow product formed by precipitation from equimolar solutions of nickel nitrate and ammonium tungstate, after adjustment with excess ammonia to pH 7 and washing and drying, corresponds by analysis to nickel tungstate containing a slight excess of ammonium tungstate. Calcination of the nickel tungstate containing a slight excess of ammonium tungstate, in the absence of air, brings about decomposition of the ammonium tungstate with an apparent concomitant reduction of the excess tungstic oxide to the blue oxide W$_2$O$_3$, as indicated by the development of a faintly green coloration of the yellow tungstate. Analysis of the product shows it to correspond to the composition $$NiWO_4.0.055W_2O_3$$

Example II

A solution of 582 g. of cobaltous nitrate hexahydrate in 2500 cc. of water was added at the rate of 1000 cc. per hour at room temperature, with stirring, to a solution containing 2 mols of ammonium tungstate

[(NH$_4$)$_2$WO$_4$]

prepared by dissolving 562 g. of ammonium tungstate octahydrate, [(NH$_4$)$_2$W$_4$O$_{13}$.8H$_2$O], in 2500 cc. of water and 100 cc. of 28% aqueous ammonia. A lavender-colored precipitate was formed in a pH range of 7.4±0.7. The precipitate was filtered without washing and dried at 120° C. for 24 hours. The dried product, which was gel-like in structure, showed a typical conchoidal fracture and a high absorptive capacity for moisture, was crushed and sized to 8 to 14 mesh and reduced in hydrogen as follows:

One hundred thirty seven grams (150 cc. of 8 to 14 mesh granules) was charged into a tubular reduction furnace and reduced in a stream of hydrogen at a space velocity of 1000 volumes of gas per volume of catalyst per hour and 450° C. for 24 hours. After the reduction cycle, the catalyst was cooled to room temperature in hydrogen, flushed with nitrogen, and discharged from the reduction furnace to a receiver under nitrogen. The reduced catalyst corresponded by analysis to cobalt tungstite containing a slight excess of W$_2$O$_3$, as represented by the composition CoWO$_3$+0.2W$_2$O$_3$. The reduced catalyst was not spontaneously pyrophoric at room temperature but on slight heating the product ignited with a bright glow and oxidized to cobalt tungstate.

Example III

An ammonium tungstate solution containing 2 moles of tungsten was prepared by dissolving 553 grams of ammonium metatungstate [(NH$_4$)$_2$W$_4$O$_{13}$.7H$_2$O] in 3 liters of water, and adding 182 grams (202.5 cc.) of 28% aqueous ammonia to convert the ammonium metatungstate to normal ammonium tungstate [(NH$_4$)$_2$WO$_4$].

To this solution was added with stirring at room temperature a solution containing 2 moles of cupric nitrate prepared by dissolving 483.3 grams of Cu(NO$_3$)$_2$.3H$_2$O in 3 liters of water. A light-blue precipitate formed in a slurry having a pH of 4.6. The pH of the slurry was adjusted to 7.0 by addition of 122 cc. of 28% aqueous ammonia. The resulting precipitate was washed, filtered, and dried at 120–130° C. The product was then reduced in a 3:1 nitrogen-hydrogen gas mixture at 500 space velocity for 32 hours starting at room temperature and increasing the temperature of reduction to 500° C. in 25 hours, holding the reduction temperature at 500° C. in 5 hours, then cooling to room temperature, in hydrogen. The reduced product corresponded by analysis to copper tungstite (CuWO$_2$) as follows:

|            | Percent Cu | Percent W | Ratio, Cu:W |
|------------|------------|-----------|-------------|
| Calculated | 21.95      | 63.50     | 1:1         |
| Found      | 23.50      | 62.35     | 1:0.93      |

Example IV

An ammonium tungstate solution containing 2 moles of tungsten was prepared by dissolving 540 grams of ammonium metatungstate in 12 liters of water and adding 155 cc. of 28% aqueous ammonia to convert the ammonium metatungstate to normal ammonium tungstate [(NH$_4$)$_2$WO$_4$].

To this solution was added with stirring at 55° C. a solution containing 2 moles of ferrous chloride prepared by dissolving 397.6 grams of $FeCl_2 \cdot 4H_2O$ in 3 liters of water. A dark olive-green precipitate was thus obtained in a slurry having a pH=7.0. The precipitate so formed was filtered, washed and dried at 120–130° C., and reduced at 400–500° C. for 32 hours in hydrogen at 1000 space velocity. The reduced product corresponded by analysis to iron tungstite ($FeWO_3$) as follows:

|  | Percent Fe | Percent W | Ratio, Fe:W |
|---|---|---|---|
| Calculated | 19.40 | 63.90 | 1:1 |
| Found | 19.37 | 61.32 | 1:0.96 |

The tungstites of this invention are prepared by the carefully controlled reduction of the tungstate salts which are prepared by precipitation in the presence of excess ammonia by mixing suitable solutions of salts of the desired metal and ammonium tungstate.

The tungstites of this invention occur in two series, the one corresponding to divalent tungsten and the other corresponding to tetravalent tungsten, and are formally derived from the hypothetical acids $H_2WO_2$ and $H_2WO_3$. Specific tungstites, in addition to nickel and cobalt, iron and copper tungstites are zinc tungstite, silver tungstite, cadmium tungstite, manganese tungstite, tin tungstite, and the like.

In some cases it is advantageous to prepare two or more tungstites simultaneously, thus obtaining them in intimate association, or to carry the reduction of the tungstite salts to a point either somewhat beyond or before the precise tungstite stage, or to employ a slight excess of one component in order to gain advantages in catalyst performance, such as for example, enhanced activity or selectivity.

As a rule the calcination step is conducted at temperatures of from 350–500° C. for from 4 to 24 hours. Usually, however, the calcination is carried on for no less than 12 hours or for more than 28 hours.

The reduction of the calcined product is effected with hydrogen alone or with hydrogen admixed with a diluent gas such as nitrogen at temperatures ranging from room temperature up to 700° C., the heating being gradual and extending over a period ranging from 2 to 100 hours depending upon the temperature schedule used. Some variations in the compositions of the tungstites may be effected by controlling the time and temperature of reduction, but in any event the reduced products correspond in composition essentially to metal tungstites of an acid of the general formula $H_2WO_2$ and $H_2WO_3$.

Although in the examples ammonium paratungstate has been used and converted to the normal tungstate by addition of ammonia to a pH of 7, this is only because the ammonium paratungstate is more readily available than the normal salt. If desired, however, the normal salt can be used and the neutralization step omitted. If desired also, ammonium metatungstate or sodium tungstate can be used, and these latter salts have some advantage in being more highly soluble in water than either the normal tungstate or ammonium paratungstate.

Precipitation of the desired metal tungstate for reduction to a tungstite can be effected either by adding a solution of the metal nitrate to a solution of normal ammonium tungstate or alternatively by adding the normal ammonium tungstate solution to a solution of the metal nitrate.

Generally, the reaction between the ammonium tungstate and the salt of the metal whose tungstite is desired is effected at temperatures in the range of 60° to 80° C. because of the low order of solubility of ammonium paratungstate in water at ordinary temperatures. If a more soluble tungstate is used, such as ammonium metatungstate or sodium tungstate, then the reaction can be carried out at ordinary temperatures. For practical reasons it is desirable that the mixing of the solutions be effected with good agitation, thus insuring the best conditions for complete reaction. In some instances it is desirable to warm the mixed solutions in order to bring about coagulation of the precipitate formed and thus make it easier to handle in the subsequent washing and filtering operations.

In the examples nickel and cobalt nitrates have been used but it is to be understood that in place thereof any water-soluble salt of the metal whose tungstite is desired may be used. Examples are copper sulfate, copper chloride, nickel sulfate, nickel chloride, nickel acetate, thorium nitrate, thorium chloride, manganese chloride, zinc chloride, zinc sulfate, zinc permanganate, iron nitrate, iron chloride, silver nitrate, cadmium chloride, cadmium nitrate, stannous chloride, stannous fluoride, stannic sulfate, cobalt nitrate, cobalt chloride and the like.

The tungstites of this invention are particularly useful as catalysts, especially for hydrogenation, dehydrogenation, and dehydration reactions. They are especially useful for the hydrogenation of carbon-carbon double bonds and for reducing carbonyl groups, for example in the conversion of benzene to cyclohexane and of acetone to isopropanol.

The tungstites of this invention are catalysts also for reactions in which hydroxyl compounds are added to olefins. For example, they are effective in adding water to propylene and isobutylene yielding isopropanol and tertiary butanol as products, in adding ethanol to isobutylene yielding ethyl tertiary butyl ether as product, and in adding acetic acid to propylene yielding isopropyl acetate as product.

As many apparently widely different embodiments of this invention may be made without departing from the spirit and scope thereof, it is to be understood that this invention is not limited to the specific embodiments thereof except as defined in the appended claims.

We claim:

1. A metal tungstite in which the metal is selected from the class consisting of nickel, cobalt, copper and iron and in which said metal is chemically combined with said tungsten in an atomic ratio of 1:1 and oxygen is chemically combined with said tungsten in an atomic ratio lower than in the tungstate of said metal and which is the product obtained by reacting ammonium tungstate in aqueous ammonia with a water soluble salt of said metal, drying the resulting reaction product, and calcining and reducing in hydrogen the dried product at a temperature of 400 to 500° C. for a period of at least 24 hours.

2. Nickel tungstite in which said nickel is chemically combined with said tungsten in an atomic ratio of 1:1 and oxygen is chemically combined with said tungsten in an atomic ratio lower than in nickel tungstate and which is the product obtained by reacting ammonium tungstate in aqueous ammonia with a water soluble salt of nickel, drying the resulting reaction product, and calcining and reducing in hydrogen the dried product at a temperature of 400 to 500° C. for a period of at least 24 hours.

3. Cobalt tungstite in which said cobalt is chemically combined with said tungsten in an atomic ratio of 1:1 and oxygen is chemically combined with said tungsten in an atomic ratio lower than in cobalt tungstate and which is the product obtained by reacting ammonium tungstate in aqueous ammonia with a water soluble salt of cobalt, drying the resulting reaction product, and calcining and reducing in hydrogen the dried product at a temperature of 400 to 500° C. for a period of at least 24 hours.

4. Copper tungstite in which said copper is chemically combined with said tungsten in an atomic ratio of 1:1 and oxygen is chemically combined with said tungsten in an atomic ratio lower than in copper tungstate and which is the product obtained by reacting ammonium tungstate in aqueous ammonia with a water soluble salt of copper, drying the resulting reaction product, and calcining and reducing in hydrogen the dried product at a temperature of 400 to 500° C. for a period of at least 24 hours.

5. Iron tungstite in which said iron is chemically combined with said tungsten in an atomic ratio of 1:1 and oxygen is chemically combined with said tungsten in an atomic ratio lower than in iron tungstate and which is the product obtained by reacting ammonium tungstate in aqueous ammonia with a water soluble salt of iron, drying the resulting reaction product, and calcining and reducing in hydrogen the dried product at a temperature of 400 to 500° C. for a period of at least 24 hours.

(References on following page)

References Cited in the file of this patent

UNITED STATES PATENTS

| | | |
|---|---|---|
| 2,145,745 | Armstrong | Jan. 31, 1939 |
| 2,339,888 | Smith | Aug. 8, 1942 |

OTHER REFERENCES

Hoffman, Lexikon der Anorganischen Verbindungen, Band 2, No. 56–81 Bibliographien, Liepzig 1912–1914, pages 728, 729, 730, 761 and 762.

Dana System of Mineralogy, vol. 1, pages 605–606, Wiley and Co., N. Y., 1944.

Mellor, Comprehensive Treatise on Inorganic and Theoretical Chemistry, vol. 11, 1931, Longmans, Green and Co., N. Y., pages 745–752.

Metallography, Dowdell, Jerabeck, Forsyth, Green, John Wiley and Son Ltd., 1943, pages 2, 4.

Handbook Physics and Chemistry, Chem. Rubber Co., Cleveland, Ohio, 1943, pages 376, 380.

Li and Wang "Tungsten" A. C. D. monograph, No. 94, Reinhold Publishing Corp., N. Y., 1947, pages 193, 194, 196, 197, 257, 272, 273, 291.